July 15, 1952      W. E. ROBERTS      2,603,028
FLOATING FISH BAG
Filed June 14, 1949
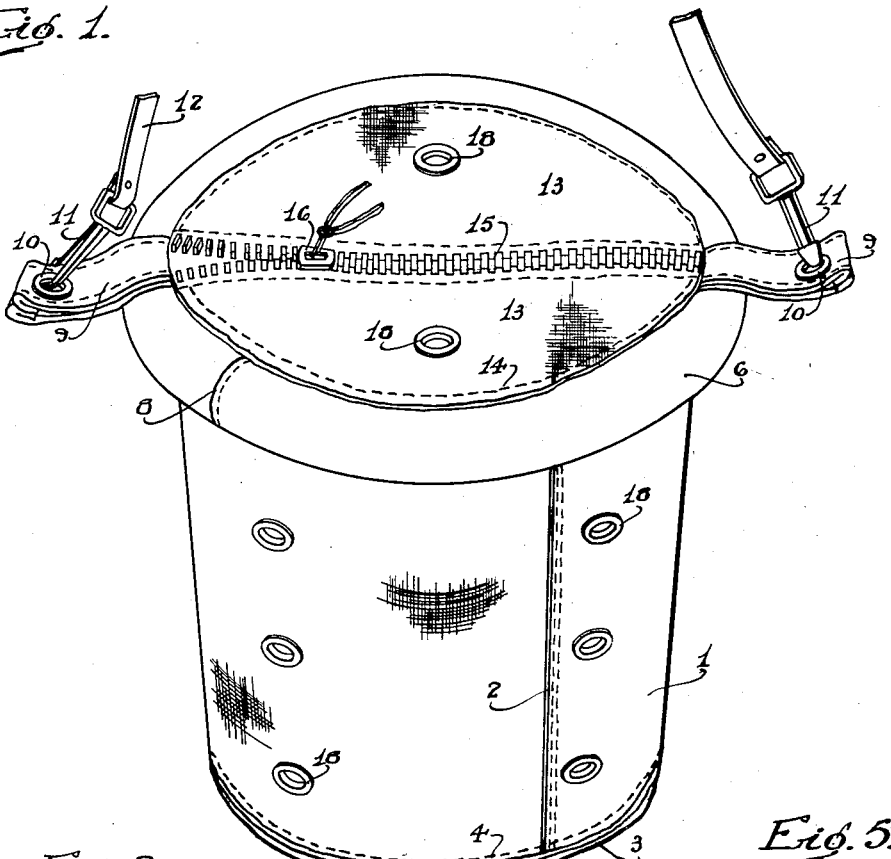
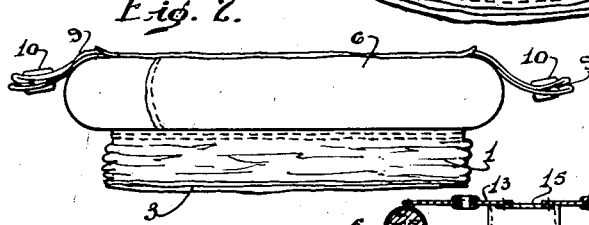
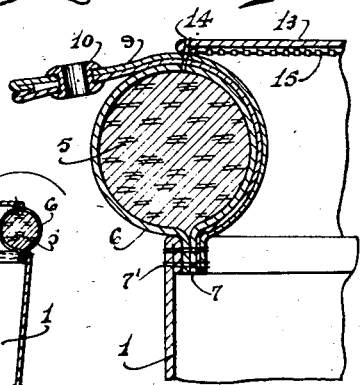
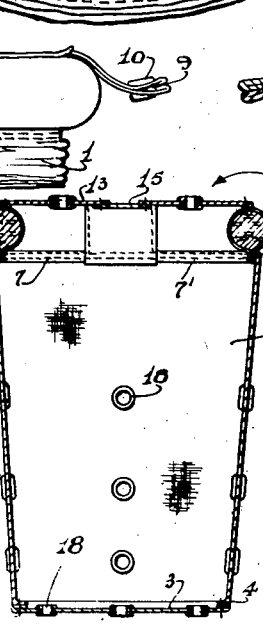
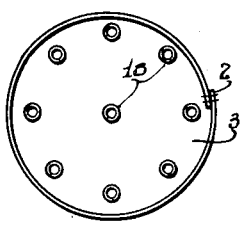
INVENTOR.
Walter E. Roberts
BY
Sutton & Sutton
Attorneys.

Patented July 15, 1952

2,603,028

UNITED STATES PATENT OFFICE 2,603,028

FLOATING FISH BAG

Walter E. Roberts, Decatur, Ala.

Application June 14, 1949, Serial No. 98,953

1 Claim. (Cl. 43—55)

The present invention relates to a floating fish bag having among its primary objects to provide a collapsible container with a ring of buoyant material whereby when the container is extended it may be used for storing fish or fishing equipment therein and when collapsed the bag may be utilized as a seat.

Another object of the invention is to provide a portable bag or container of the above character formed from light weight and flexible materials capable of being submerged in water for storing freshly caught fish therein and yet be comparatively inexpensive to manufacture for rendering the same commercially desirable.

Other objects of the invention will be in part obvious and in part pointed out hereinafter as the description continues.

In the accompanying drawings:

Fig. 1 is a perspective view of the bag embodying the present invention when the container thereof is in its extended position, the top or cover being partly opened and a portion of the carrying strap being removed.

Fig. 2 is a side elevation of the bag with the container thereof shown in its collapsed position.

Fig. 3 is a transverse central sectional view of the bag with the container in its extended position.

Fig. 4 is a bottom plan view, and

Fig. 5 is an enlarged detail sectional view taken at right angles to that shown in Fig. 3.

The floating fish bag is preferably made from sheeting materials such as ducking, canvas, plastic and the like having a roll of kapok, cork or similar loose resilient or buoyant materials. The container 1 of the bag consists of a single sheet of material having its opposite vertical marginal edges sewed together as at 2 to form a cylinder or tube. The bottom 3 is in the form of a disc of the same material as that of the tube 1 having marginal edges connected to the lower end of the latter by means of the stitching 4.

The kapok or cork 5 may be formed into a cylindrical ring or housed within a tube 6. The tube 6 is also made from a single sheet of material having its opposite marginal edges sewed together to form a depending rib 7 and the opposite ends of the tube are connected by means of the stitching 8 to form a continuous cylindrical ring. The upper opened end of the container 1 is attached to the rib 7 by means of the stitching 7' as shown.

A pair of carrying tabs 9 each have one end secured to the rib 7 and extend over the tube 6 whereby their outer or free ends extend diametrically opposite from one another and the ring or tube 6. Each tab 9 is formed from laminated sheets of flexible material stitched together as shown and eyelets 10 are provided in the outer free ends thereof. By means of the snap-hooks 11 secured to the opposite ends of a carrying strap 12, the latter may be detachably connected to the eyelets 10 of the tabs 9.

The cover forming the upper end of the container 1 is formed from two semi-circular sheets 13 of the same material as that of the container and each having their circular marginal edges secured to the tube 6 by means of the stitching 14. The adjacent straight and parallel edges of the sections 13 of the cover have each secured thereto one section of a conventional zipper 15 whereby through the sliding movement of the connector 16, the sections 13 may be connected together. When the zipper connects the sections 13 together a taut sheet of material completely covers the upper open end of the container 1, but when the sections 13 are disconnected, a narrow opening is formed therebetween, only a sufficient size as to permit small fish or articles such as fishing equipment to be inserted therebetween and dropped within the container 1. However, when a larger opening is required between the sections 13 of the cover, one may grasp the opposed sides of the tube 6 and by giving the latter a turn in the direction of the arrow, as shown in Fig. 3 of the drawings, sufficient slack is given to the sections of the cover as will permit of a larger opening therein whereby larger fish may be inserted through the cover into the container 1. The flexible materials employed in forming the tube or ring 6 and the sections 13 of the cover permit of this rolling movement whereby the entrance opening to the container may be enlarged as required and yet when the tube 6 is released and the sections 13 again zipped together, a straight and taut covering is provided whereby the ring 6 may be used as a seat.

The cover sections 13, container 1 and bottom 3 have spaced eyelets or grommet holes 18 secured thereto whereby air and water may enter and freely flow therethrough or therefrom.

The collapsible container not only permits the bag to be more readily carried or take up only a comparatively small amount of space when not in use, but its being made from sheet materials affords a flexible or spring cushion for the ring 6 when employed as a seat. The strap 12 when attached to the tabs 9 can extend over one's shoulder when carrying the bag or the latter may be submerged in water and one end of the strap connected to a boat or wharf, whereby the bag is permitted to float without the likelihood of the same becoming entangled with the propeller of a motor boat or snagged by under water obstacles. As fish are caught they may be easily and readily inserted within the container of the bag and the latter, by keeping afloat, will permit the fish to be kept alive and clean. Fish may be stored and iced within the container during transit and the eyelet openings 18 will provide the required drainage.

I claim:

A floating fish bag comprising a collapsible container having its upper end opened, a tube, solid buoyant material housed within said tube, a rib depending from said tube and connected to the upper opened end of said container, a pair of carrying tabs each having one end secured to said rib and their opposite or free ends extending diametrically opposite from one another over said tube, a sectional disc-shaped cover comprising two semi-circular flexible sheets having their circular marginal edges secured to said tube between said tabs and their parallel edges normally spaced apart to form an opening of limited size therebetween, and separable fastener means for connecting the parallel edges of the sections of said cover to close the opening therebetween, said tube being capable of being rolled inwardly for enlarging the opening between the parallel edges of the sections of said cover when the latter are disconnected from said separable fastener means and said cover having grommet holes therein.

WALTER E. ROBERTS.

REFERENCES CITED

The following references are of record in the file of this patent:

UNITED STATES PATENTS

| Number | Name | Date |
|---|---|---|
| 228,948 | Sheldon | June 15, 1880 |
| 988,897 | Raymond | Apr. 4, 1911 |
| 1,997,637 | Gebelein | Apr. 16, 1935 |
| 2,036,876 | Kraft | Apr. 7, 1936 |
| 2,061,302 | Egler | Nov. 17, 1936 |
| 2,241,314 | Mohler | May 6, 1941 |
| 2,302,802 | Roberts | Nov. 24, 1942 |

FOREIGN PATENTS

| Number | Country | Date |
|---|---|---|
| 8,824 | Great Britain | 1915 |